(12) United States Patent
Kim et al.

(10) Patent No.: US 11,479,842 B2
(45) Date of Patent: Oct. 25, 2022

(54) HEAT TREATMENT METHOD FOR A VEHICLE COMPONENT

(71) Applicants: HYUNDAI MOTOR COMPANY, Seoul (KR); KIA MOTORS CORPORATION, Seoul (KR)

(72) Inventors: Dong-Hwi Kim, Yongin-si (KR); Soon-Woo Kwon, Anyang-si (KR); Chung-An Lee, Hwaseong-si (KR); Hyun-Ki Kim, Hwaseong-si (KR); Seung-Hyun Hong, Seoul (KR); Min-Woo Kang, Incheon (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 17/175,384

(22) Filed: Feb. 12, 2021

(65) Prior Publication Data

US 2022/0178010 A1     Jun. 9, 2022

(30) Foreign Application Priority Data

Dec. 8, 2020   (KR) .................. 10-2020-0170205

(51) Int. Cl.
  *C23C 8/26*         (2006.01)
(52) U.S. Cl.
  CPC ..................... *C23C 8/26* (2013.01)
(58) Field of Classification Search
  CPC ............... C23C 8/26; C23C 8/02; C23C 8/08
  See application file for complete search history.

(56) References Cited

U.S. PATENT DOCUMENTS

2009/0026963 A1   1/2009  Susuki
2012/0082586 A1*  4/2012  Moyer .................. C22C 38/26
                                                 419/13

FOREIGN PATENT DOCUMENTS

| KR | 20050009965 A | 1/2005 |
| KR | 20050106534 A | 11/2005 |
| KR | 20070088701 A | 8/2007 |
| KR | 100800362 B1 | 2/2008 |
| KR | 100837789 B1 | 6/2008 |
| KR | 20150050760 A | 5/2015 |
| KR | 20180090907 A | 8/2018 |

* cited by examiner

*Primary Examiner* — Jessee R Roe
(74) *Attorney, Agent, or Firm* — Lempia Summerfield Katz LLC

(57) ABSTRACT

A heat treatment method of a component for a vehicle includes: heating an inner space of a heat treatment furnace in which a component for a vehicle is disposed in the inner space; stabilizing hydrogen ($H_2$) by injecting the $H_2$ into the inner space; and performing nitrification heat treatment for the component by injecting only ammonia ($NH_3$) into the inner space after the stabilizing. The heat treatment method may adjust the degree of vacuum and the flow rate instead of a Kn without additionally injecting the $H_2$ gas into an $NH_3$ gas, thereby implementing the nitrification heat treatment of a quality similar to that of a conventional nitrification heat treatment for a short time.

15 Claims, 6 Drawing Sheets

HEAT TREATMENT METHOD FOR A VEHICLE COMPONENT

CROSS-REFERENCE TO RELATED APPLICATION

This application claims priority to Korean Patent Application No. 10-2020-0170205 filed on Dec. 8, 2020, which is incorporated herein by reference in its entirety.

BACKGROUND OF THE DISCLOSURE

Field of the Disclosure

The present disclosure relates to a heat treatment method for securing the durability characteristics of a component for a vehicle.

Description of Related Art

A component for a vehicle secures the durability characteristics through heat treatment processes of various methods according to each characteristic driving environment. Particularly, nitrification heat treatment is applied to a component in which the contact occurs together with tensile/twist/bending like a gear or a shaft to secure the abrasion resistance and the fatigue characteristics at the same time in many cases. Until now, nitrification heat treatment has been designed to impart the heat treatment condition through the combination of the temperature-nitrogen potential-time in the equipment at a normal pressure (1 atmospheric pressure) or more.

Particularly, in the related art, nitrogen or hydrogen is additionally injected into an ammonia gas upon the nitrification heat treatment for adjusting the nitrogen potential. Such a mixed gas is advantageous for the nitrogen potential control but reduces the partial pressure of the ammonia gas actually participating in the reaction, thereby becoming the basic cause reducing the reaction speed.

Further, some patented processes of the related art, which are related to the low-pressure nitrification process. are confirmed to also reduce the reaction speed using the ammonia/nitrogen/hydrogen mixed gas.

The contents described in the Description of Related Art section are to help understand the background of the present disclosure and may include what is not previously known to those having ordinary skill in the art to which the present disclosure pertains.

SUMMARY OF THE DISCLOSURE

The present disclosure is devised to solve the above problem. An object of the present disclosure is to provide a heat treatment method of a component for a vehicle. The heat treatment method may adjust the degree of vacuum and a flow rate instead of a nitrogen potential without injecting an additional gas into an ammonia gas, thereby implementing the nitrification heat treatment of the quality similar to that of the conventional nitrification heat treatment for a short time.

A heat treatment method of a component for a vehicle according to one aspect of the present disclosure includes: heating an inner space of a heat treatment furnace in which a component for a vehicle is disposed in the inner space; stabilizing the inner space by injecting hydrogen ($H_2$) into the inner space; and performing nitrification heat treatment for the component by injecting only ammonia ($NH_3$) into the inner space after the stabilizing.

Further, the performing of the nitrification heat treatment injects the $NH_3$ at the speed of 0.5 to 6 $m^3/h$.

Further, the performing of the nitrification heat treatment is performed by maintaining the pressure of the inner space at 230 to 400 torr.

Further, the performing of the nitrification heat treatment is performed in the state where the temperature of the inner space is 400 to 600° C. by the heating.

The performing of the nitrification heat treatment is performed for 6 to 15 hours.

Meanwhile, the stabilizing injects the $H_2$ at the speed of 0.5 to 15 $m^3/h$.

Further, the stabilizing is performed by maintaining the pressure of the inner space at 230 to 400 torr.

Further, the stabilizing is performed in the state where the temperature of the inner space is 400 to 600° C. by the heating.

Further, the stabilizing is performed within 2 hours.

The thickness of a compound layer formed on the surface of the component subjected to the nitrification heat treatment is 8 to 20 μm.

Alternatively, the thickness of a pore layer formed on the surface of the component subjected to the nitrification heat treatment is 2 to 5 μm.

Further, the surface hardness of the component subjected to the nitrification heat treatment is 620 to 710 Hv.

Alternatively, the depth of a diffusion layer of the surface of the component subjected to the nitrification heat treatment is 0.5 mm or less.

Further, the gamma prime (γ') phase of a microstructure of the surface of the component subjected to the nitrification heat treatment is 50 to 90%.

Next, a heat treatment method of a component for a vehicle according to another aspect of the present disclosure performs nitrification heat treatment for a component by injecting only $NH_3$ into the inner space at the speed of 0.5 to 6 $m^3/h$ in a state where an inner space of a heat treatment furnace, in which a component for a vehicle is disposed in the inner space, is maintained at 400 to 600° C.

Further, the nitrification heat treatment is performed by maintaining the pressure of the inner space at 230 to 400 torr.

The performing of the nitrification heat treatment is performed for 6 to 15 hours.

The heat treatment method of a component for the vehicle according to the present disclosure may secure the compound layer, the pore layer, the surface hardness, the diffusion layer, and the γ' phase, which are equal to or more than those of the conventional nitrification heat treatment even with only the $NH_3$ gas.

Further, the physical property may be implemented for a shorter time than that of the conventional nitrification heat treatment.

DESCRIPTION OF SPECIFIC EMBODIMENTS

To fully understand the present disclosure, the operational advantages of the present disclosure, and the object achieved by the practice of the present disclosure, reference should made to the accompanying drawings illustrating an embodiment of the present disclosure and the contents described in the accompanying drawings.

In describing the disclosed embodiment of the present disclosure, the description of the known technology or the repetitive description capable of unnecessarily obscuring the gist of the present disclosure has been reduced or omitted.

Figure 1:
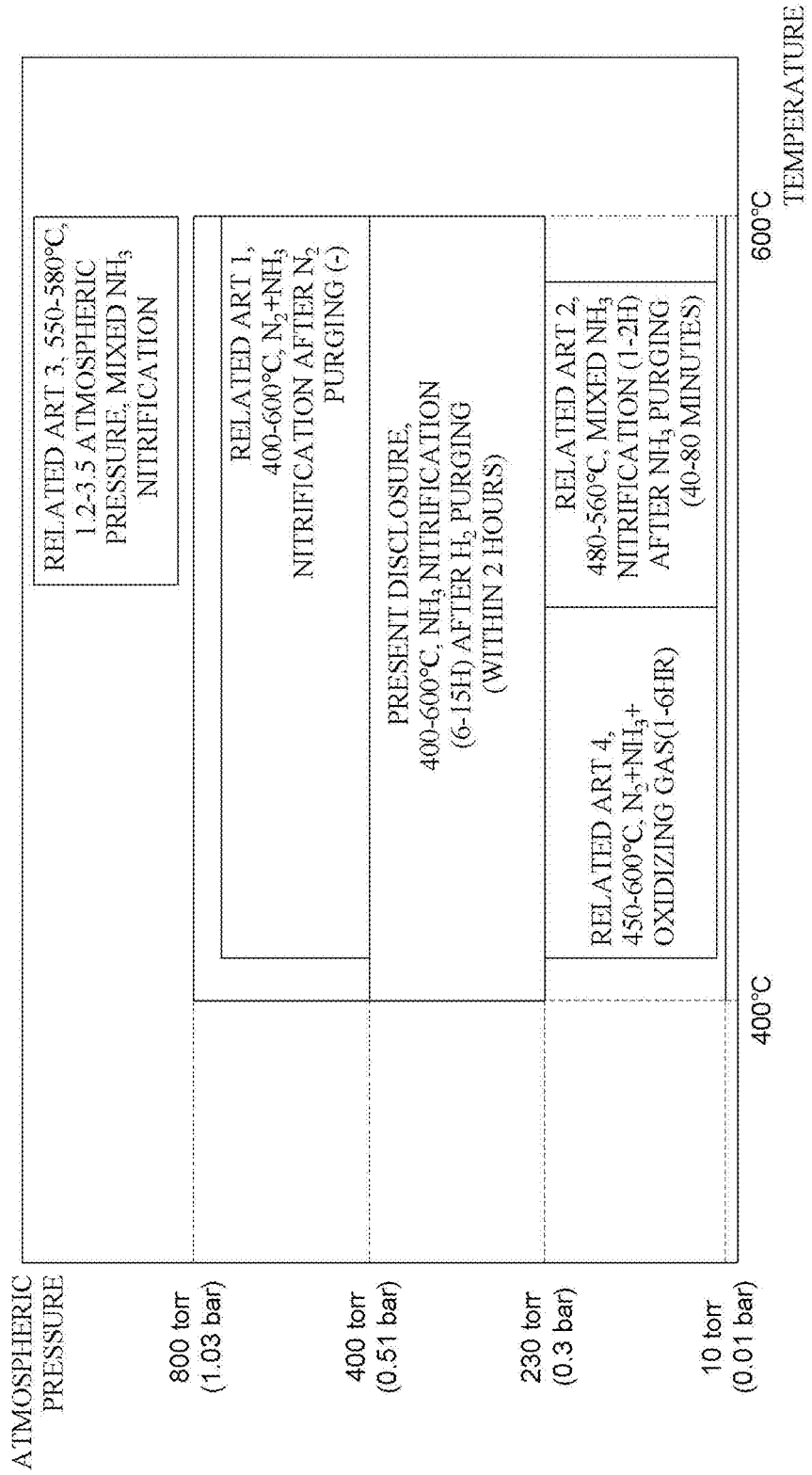
FIG. 1 is a diagram illustrating a comparison between the temperature, atmospheric pressure, and the like of a heat treatment method according to the present disclosure with those of patented processes of the related art.

FIG. 1 is a diagram illustrating a comparison between the temperature, atmospheric pressure, and the like of a heat treatment method according to the present disclosure with those of related art patented processes.

Hereinafter, a heat treatment method of a component for a vehicle according to an embodiment of the present disclosure is described with reference to FIG. 1.

In the related art, heat treatment for the durability of a component for a vehicle performs the heat treatment by additionally injecting nitrogen ($N_2$) to ammonia ($NH_3$) by a low-pressure process to adjust an equilibrium condition based on the ammonia resolution (Kn) to control the quality of a compound layer.

An ammonia resolution reaction formula is as follows.

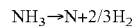

$$NH_3 \rightarrow N + 2/3 H_2$$

Further, the reaction equilibrium constant (K) is as follows.

$$K = P_{NH_3} / \{[N] + PH_2^{2/3}\}$$

Therefore, the ammonia resolution (Kn) is as follows.

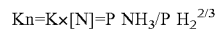

$$Kn = K \times [N] = P\,NH_3 / P\,H_2^{2/3}$$

Therefore, if the Kn is high, the partial pressure of the $NH_3$ is high, such that an available nitrogen amount is increased.

Upon the real heat treatment, the Kn is controlled by injecting $N_2$ or hydrogen ($H_2$), and the Kn is increased when $N_2$ is injected and the Kn is decreased when $H_2$ is injected.

The heat treatment condition according to the related art is summarized in Table 1 below. The related art 1 is the low-pressure process but the process is configured in the form of adding $N_2$ to $NH_3$ to adjust the Kn and controlling the physical property of the compound.

TABLE 1

| Items | Temperature | Gas | Atmospheric pressure | Flow rate | Time | Remark |
|---|---|---|---|---|---|---|
| Related Primary art 1 | Heating: 400~600° C. Primary nitrification: 400~600° C. Secondary nitrification: 400~600° C. | Heating: $N_2$ or inert gas Primary nitrification: $NH_3 + N_2$ Secondary nitrification: $N_2$ | Heating: X Primary nitrification: 10~800 torr Secondary nitrification: 400~800 torr | x | Heating: X Primary nitrification: 1~6 hours Secondary nitrification: 2 hours or more | |
| Related art 2 | Heating: 480~560° C. nitrification: 480~560° C. (final heating temperature maintenance) Cooling: final heating temperature-10~30° C. Oxidation: final cooling maintenance | Heating: $NH_3$ Nitrification: $NH_3 + N_3 + N_2O$ Cooling: $N_2$ Oxidation: $N_2 + H_2O$ | Heating: X Nitrification 500~300 mbar (38.5~230.9 torr) Cooling: x Oxidation: x | x | Heating: 40~80 minutes Nitrification: 60~120 minutes Cooling: 10~30 minutes Oxidation: 10~50 minutes | Nitrified gas $NH_3$ 50~80% $N_2$ 10~30% $N_2O$ 5~20% |
| Related art 3 | Primary heating treatment: 440~490° C. Secondary heating treatment: 500~580° C. Tertiary heating treatment: 550~580° C. Primary nitrification: tertiary heating treatment temperature maintenance Secondary nitrification: temperature maintenance | Primary heat treatment: $N_2$ Secondary heat treatment: $N_2 + CO_2$ Tertiary heat treatment: $N_2 + CO_2$ Primary nitrification: $NH_3 + CO_2 + N_2$ Secondary nitrification: x(discharge) Tertiary nitrification: x(maintenance) Cooling: $N_2$ | Primary heat treatment: 0.5~1.2 atmospheric pressure (390~936 torr) Secondary heat treatment: 0.8~1.2 atmospheric pressure Tertiary heat treatment: x Primary nitrification: 1.2~3.5 atmospheric pressure (936~2730 torr) Secondary nitrification: x(discharge) | x | Primary: 15~25 minutes Secondary: 8~13 minutes Tertiary: 15~25 minutes Primary nitrification: 45~120 minutes Secondary: 15~25 minutes Tertiary: x Fourth: 30~60 minutes | Secondary/tertiary gases $N_2$ 50% $CO_2$ 50% Primary nitrification gases NH3 55~90% $CO_2$ 5~10% $N_2$ 5~35% |

TABLE 1-continued

| Items | Temperature | Gas | Atmospheric pressure | Flow rate | Time | Remark |
|---|---|---|---|---|---|---|
| Related art 4 | Tertiary nitrification: 450~500° C. Cooling 0° C. Heating: 180~350° C. Pre-oxidation: x Secondary heating: x Nitrification: 450~600° C. Cooling and oxidation: 450~520° C. Cooling: oxidation | Heating: $N_2$ after vacuum Pre-oxidation: oxidizing gas Secondary heating: $NH_3$ Nutrification: $NH_3 + N_2$ + oxidizing gas Cooling and oxidation: $H_2O$ Cooling: $N_2$ | Tertiary nitrification: x(maintenance) Cooling: x Heating: vacuum discharge Pre-oxidation: X Secondary heating: vacuum exhaust Nitrification: 50~1000 mbar Cooling and oxidation: 1 atmospheric pressure Cooling: vacuum exhaust | x | Heating: X Pre-oxidation: 30~60 minutes Secondary heating: X Nitrification: X Cooling and oxidation: 5~100 minutes Cooling: x | Oxidizing gases NOx COx air |

Unlike the aforementioned related arts, the present disclosure injects only the ammonia gas to adjust the atmospheric pressure and the flow rate within a heat treatment furnace to control the quality (reaction speed) of the compound layer.

In other words, the reaction (decomposition) speed of the gas is inversely proportional to the density of the gas molecules (density ↑→ collision between the gas molecules ↑→ reaction speed ↓).

Further, the reaction (decomposition) speed of the gas is inversely proportional to the gas flow speed within the furnace (gas speed ↑→ collision between gas molecules-component ↑→ reaction speed ↓).

Using the above, the present disclosure adjusts the ammonia decomposition speed through the combination of the temperature upon the heat treatment, the pressure within the furnace, and the flow rate within the furnace to control the thickness and the phase fraction of the compound layer.

Figure 2:
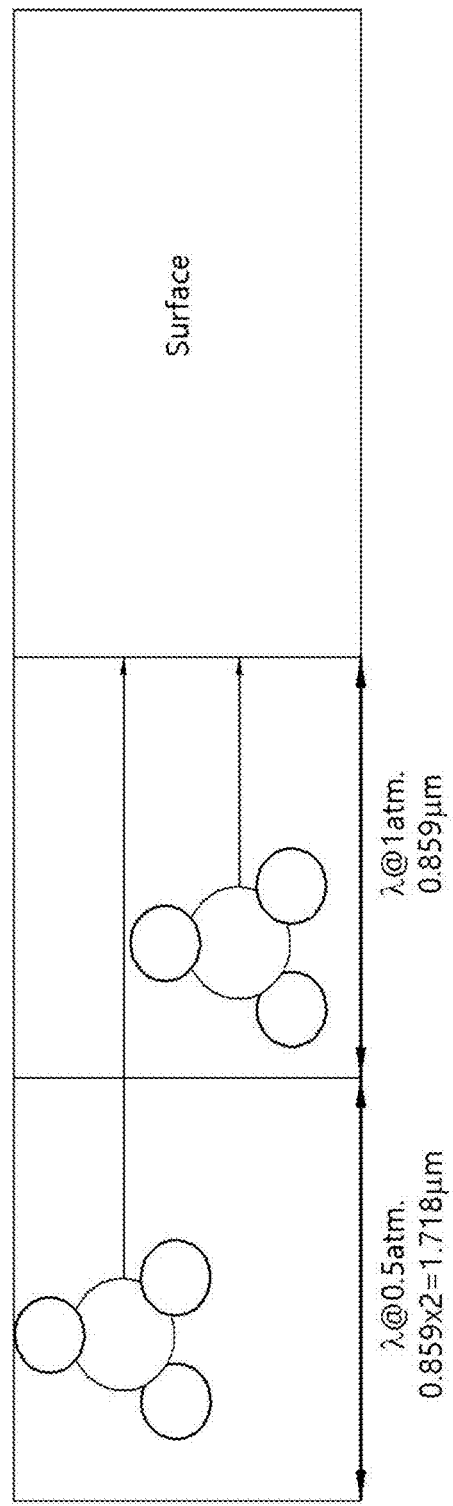
FIG. 2 is a diagram for explaining a difference in principle between the heat treatment method according to the present disclosure and the conventional method.

When describing a difference in principle between the heat treatment method according to the present disclosure and the conventional method with reference to FIG. 2, since the gas is injected after the ammonia resolution (Kn) is adjusted by mixing the gas, the ammonia resolution is converged to an equilibrium phase fraction rate determined by the heat treatment temperature+Kn with the time.

However, the present disclosure has no concept of adjusting the Kn separately, and the partial pressure of $H_2$ is 0, such that the Kn is infinite (determined by Kn=partial pressure of $NH_3$/partial pressure of $H_2$).

In other words, since the ammonia is unlimitedly decomposed immediately from the surface of the component, the present disclosure has the concept which may be close to the concept of stopping the decomposition in the appropriate condition in which the temperature/the atmospheric pressure/the flow rate should be adjusted to adjust the quality (reaction speed) of the compound layer, rather than being converged to the equilibrium state.

The present disclosure summarized to be compared with Table 1 is expressed in Table 2 below. The contents of describing the conditions such as the temperature, pressure, and the like of the present disclosure and the related art in the graph are the same as those of FIG. 1.

TABLE 2

| Items | Temperature | Gas | Atmospheric pressure | Flow rate | Time |
|---|---|---|---|---|---|
| Present disclosure | Heating: 400~600° C. Primary stabilization: 400~600° C. Secondary nitrification: 400~600° C. | Heating: $H_2$ purge Primary stabilization: $H_2$ (vacuum) Secondary nitrification: $NH_3$ (vacuum) | Heating: 230~780 torr Primary stabilization: 230~400 torr Secondary nitrification: 230~400 torr | Primary stabilization: 0.5~15 m³/h Secondary stabilization: 0.5~6 m³/h | Heating: X Primary stabilization: within 2 hours secondary nitrification: 6~15 hours |

The heat treatment method of a component for a vehicle according to the present disclosure, i.e., the vacuum nitrification heat treatment process, may be summarized as follows with reference to Table 2.

In the heat treatment of a component for a vehicle according to the present disclosure, the manufactured metal (may be an iron-based) component is disposed in the inner space of the furnace for the heat treatment, and then the heating and the $H_2$ purge are performed.

The heating in one example is 400 to 600° C., and $H_2$ is purged until the pressure becomes 230 to 780 torr.

Thereafter, the heated temperature is maintained for the primary stabilization, and $H_2$ is supplied at the speed of 0.5 to 15 m³/h, such that the inner pressure becomes 230 to 400 torr, and the stabilization time in one example is within 2 hours.

After the primary stabilization, the temperature is maintained at 400 to 600° C., and only $NH_3$ is supplied.

$NH_3$ is supplied at the speed of 0.5 to 6 m³/h such that the inner pressure becomes 230 to 400 torr, and a secondary nitrification time in one example is 6 to 15 hours.

It may be confirmed that it is possible to secure the compound layer and the surface hardness for a short time by the aforementioned heat treatment condition. The Examples and experimental examples according to the present disclosure are summarized in Tables 3 and 4 below.

TABLE 3

| | Temperature (° C.) | Atmospheric pressure (atm) | Time (h) | Flow rate of NH$_3$ (m$^3$/h) | Thickness of compound (μm) | Thickness of pore layer (μm) | Depth of diffusion layer (mm) | γ' fraction rate (%) | Hardness (Hv) |
|---|---|---|---|---|---|---|---|---|---|
| Example 1 | 540 | 0.5 | 6 | 1 | 9.7 | 2.1 | 0.31 | 68.7 | 678 |
| Example 2 | 540 | 0.5 | 10 | 1 | 11.6 | 3.5 | 0.39 | 75.9 | 691 |
| Example 3 | 540 | 0.5 | 15 | 1 | 12.5 | 4.0 | 0.43 | 85.3 | 682 |
| Example 4 | 540 | 0.3 | 6 | 1 | 12.1 | 3.6 | 0.30 | 72.8 | 670 |
| Example 5 | 540 | 0.3 | 10 | 1 | 12.3 | 3.9 | 0.40 | 65.4 | 637 |
| Example 6 | 540 | 0.3 | 15 | 1 | 13.1 | 4.0 | 0.41 | 62.1 | 625 |
| Example 7 | 540 | 0.3 | 10 | 0.5 | 10.8 | 4.0 | 0.38 | 72.4 | 671 |
| Example 8 | 540 | 0.3 | 10 | 6 | 11.5 | 3.7 | 0.40 | 69.7 | 668 |
| Example 9 | 580 | 0.5 | 6 | 1 | 14.7 | 4.6 | 0.42 | 51.4 | 651 |
| Example 10 | 580 | 0.5 | 15 | 1 | 16.8 | 4.8 | 0.49 | 58.7 | 620 |
| Example 11 | 580 | 0.3 | 6 | 1 | 13.9 | 3.9 | 0.40 | 62.1 | 664 |
| Example 12 | 580 | 0.3 | 15 | 1 | 17.2 | 4.3 | 0.47 | 54.2 | 630 |
| Example 13 | 510 | 0.5 | 6 | 1 | 9.1 | 2.0 | 0.23 | 79.1 | 708 |
| Example 14 | 510 | 0.5 | 15 | 1 | 9.8 | 2.2 | 0.31 | 88.4 | 689 |
| Example 15 | 510 | 0.3 | 6 | 1 | 9.3 | 2.1 | 0.22 | 80.4 | 696 |
| Example 16 | 510 | 0.3 | 15 | 1 | 10.0 | 2.2 | 0.30 | 85.7 | 695 |
| Example 17 | 450 | 0.3 | 6 | 0.5 | 8.0 | 2.1 | 0.20 | 89.7 | 707 |
| Example 18 | 450 | 0.3 | 15 | 1 | 9.1 | 2.2 | 0.24 | 83.4 | 699 |
| Example 19 | 580 | 0.5 | 15 | 6 | 19.8 | 4.3 | 0.49 | 51.1 | 624 |

TABLE 4

| | Temperature | Atmospheric pressure | Time | Flow rate |
|---|---|---|---|---|
| Example 1 | — | Upper limit | Lower limit | — |
| Example 2 | — | Upper limit | — | — |
| Example 3 | — | Upper limit | Upper limit | — |
| Example 4 | — | Lower limit | Lower limit | — |
| Example 5 | — | Lower limit | — | — |
| Example 6 | — | Lower limit | Upper limit | — |
| Example 7 | — | Lower limit | — | Lower limit |
| Example 8 | — | Lower limit | — | Upper limit |
| Example 9 | Upper limit | Upper limit | Lower limit | — |
| Example 10 | Upper limit | Upper limit | Upper limit | — |
| Example 11 | Upper limit | Lower limit | Lower limit | — |
| Example 12 | Upper limit | Lower limit | Upper limit | — |
| Example 13 | — | Upper limit | Lower limit | — |
| Example 14 | — | Upper limit | Upper limit | — |
| Example 15 | — | Lower limit | Lower limit | — |
| Example 16 | — | Lower limit | Upper limit | — |
| Example 17 | Lower limit | Lower limit | Lower limit | Lower limit |
| Example 18 | Lower limit | Lower limit | Upper limit | — |
| Example 19 | Upper limit | Upper limit | Upper limit | Upper limit |

As summarized in Tables 3 and 4, it may be seen that it is possible to secure the surface characteristics in which the thickness of the compound is 8 to 20 μm, the thickness of the pore layer is 2 to 5 μm, the surface hardness is 620 to 710 Hv, and the diffusion layer is 0.5 mm or less, upon the heat treatment within a range of the nitrification conditions (the temperature, the pressure, the flow rate, and the time) according to the present disclosure. It may also be seen that it is possible to secure the γ' phase of 50 to 90%.

Further, Comparative Examples out of the range of the Examples of the present disclosure are summarized in Table 5 below.

TABLE 5

| | Temperature (° C.) | Atmospheric pressure (atm) | Time (h) | Flow rate of NH$_3$ (m$^3$/h) | Thickness of compound (μm) | Thickness of pore layer (μm) | Depth of diffusion layer (mm) | γ' fraction rate (%) | Hardness (Hv) |
|---|---|---|---|---|---|---|---|---|---|
| Comparative Example 1 | 540 | 1.0 | 22 | 10 | 13.9 | 3.0 | 0.41 | 87.3 | 677 |
| Comparative Example 2 | 540 | 1.0 | 10 | 1 | 5.5 | 0.7 | 0.37 | 78.5 | 708 |
| Comparative Example 3 | 580 | 1.0 | 15 | 6 | 22.4 | 4.8 | 0.42 | 25.8 | 626 |
| Comparative Example 4 | 430 | 0.5 | 15 | 1 | 3.8 | 0.7 | 0.19 | 92.1 | 716 |
| Comparative Example 5 | 430 | 0.5 | 20 | 1 | 5.1 | 0.7 | 0.20 | 90.4 | 706 |
| Comparative Example 6 | 600 | 0.5 | 6 | 1 | 25.7 | 5.7 | 0.37 | 27.1 | 594 |
| Comparative Example 7 | 540 | 0.5 | 10 | 0.3 | 6.9 | 2.4 | 0.34 | 77.2 | 661 |
| Comparative Example 8 | 510 | 0.2 | 15 | 1 | — | — | 0.08 | — | — |
| Comparative Example 9 | 540 | 0.2 | 10 | 1 | 4.2 | 0.8 | 0.34 | 77.2 | 661 |
| Comparative Example 10 | 540 | 0.5 | 5 | 1 | 7.1 | 1.8 | 0.26 | 60.2 | 659 |
| Comparative Example 11 | 580 | 0.5 | 5 | 1 | 11.3 | 3.9 | 0.37 | 37.4 | 609 |

It may be seen that Comparative Example 1 is the case where N$_2$ is mixed with NH$_3$, and Comparative Example 2 is the case of comparing the normal pressure/low pressure with those of Example 2 with only NH$_3$ and the compound is insufficient. It may be seen that Comparative Example 3 is the case of comparing the normal pressure/low pressure with those of Example 19 with only NH$_3$ and the pore layer side is excessive, and the hardness and the phase fraction rate are insufficient. It may be seen that in Comparative Example 4, the temperature is insufficient, and the compound is insufficient, and in Comparative Example 5, the temperature is insufficient, and the compound is insufficient in the time excess condition. It may be seen that in Comparative Example 6, the gamma prime (γ') phase, Fe4N fraction rate is rapidly decreased by the temperature excess to form an austenite.

It may be seen that in Comparative Example 7, the compound is insufficient due to the insufficiency of the flow rate. It may be seen that in Comparative Examples 8 and 9, the compound is not formed or insufficient due to the insufficiency of the atmospheric pressure. It may also be seen in Comparative Examples 10 and 11, the compound is insufficient due to the insufficiency of the time or the compound fraction rate is insufficient.

As described above, unlike the Comparative Examples, it may be seen that the Examples of the present disclosure may secure the surface characteristics in which the thickness of the compound layer is 8 to 20 μm, the pore layer is 2 to 5 μm, the surface hardness is 620 to 710 Hv, and the thickness of the diffusion layer is 0.5 mm or less when the corresponding heat treatment is performed, and may secure the γ' phase of 50 to 90%.

Figure 3:
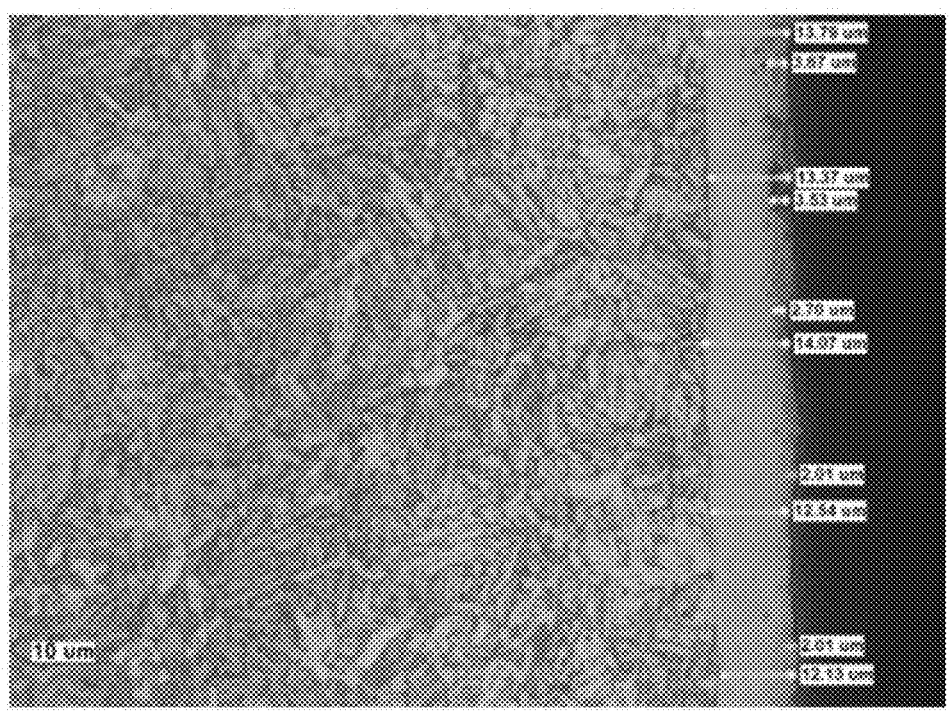
FIG. 3 is a diagram illustrating a microstructure by the heat treatment of Comparative Example 1 of the present disclosure.

FIGS. 3-6 are pictures or photographs of the real microstructures. FIG. 3 illustrates the microstructure of Comparative Example 1 of the condition of 540° C., 1 atmospheric pressure, and 22 hours, and illustrates that the thickness is 13.9 μm, the thickness of the pore layer is 3.0 μm, the hardness is 677 Hv, and the γ' fraction rate is 87.3%.

Figure 4:
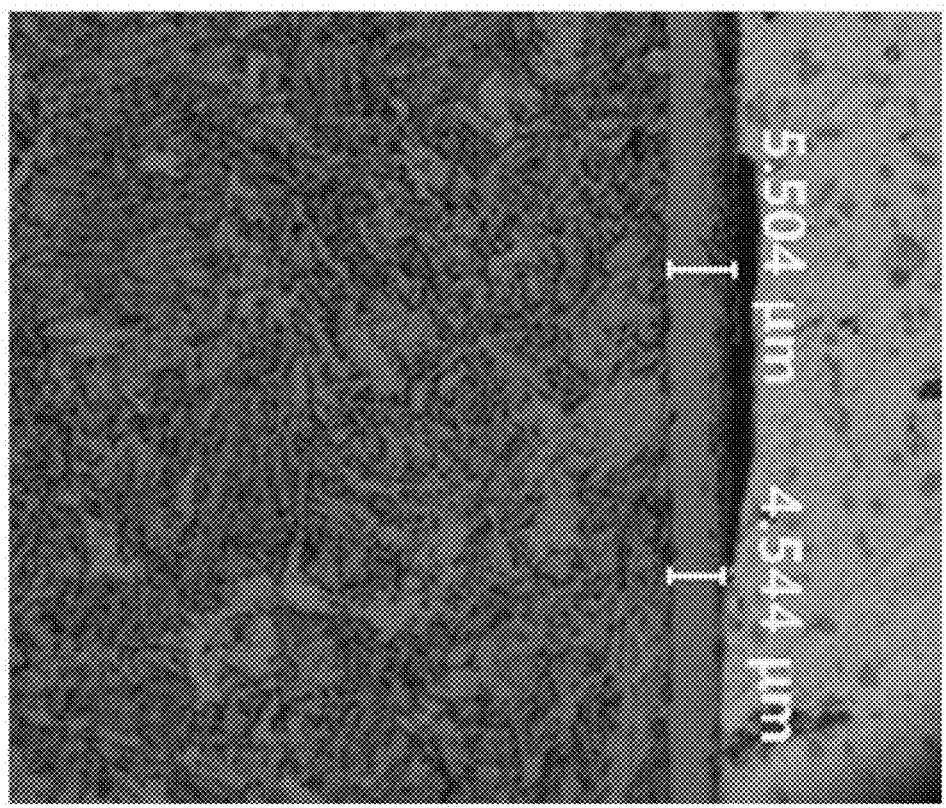
FIG. 4 is a diagram illustrating a microstructure by the heat treatment of Comparative Example 1 of the present disclosure.

FIG. 4 illustrates the microstructure of Comparative Example 2 of the condition of 540° C., 1 atmospheric pressure, and 10 hours, and illustrates that the thickness is 5.5 μm, the thickness of the pore layer is 0.7 μm, the hardness is 708 Hv, and the γ' fraction rate is 78.5%.

Figure 5:
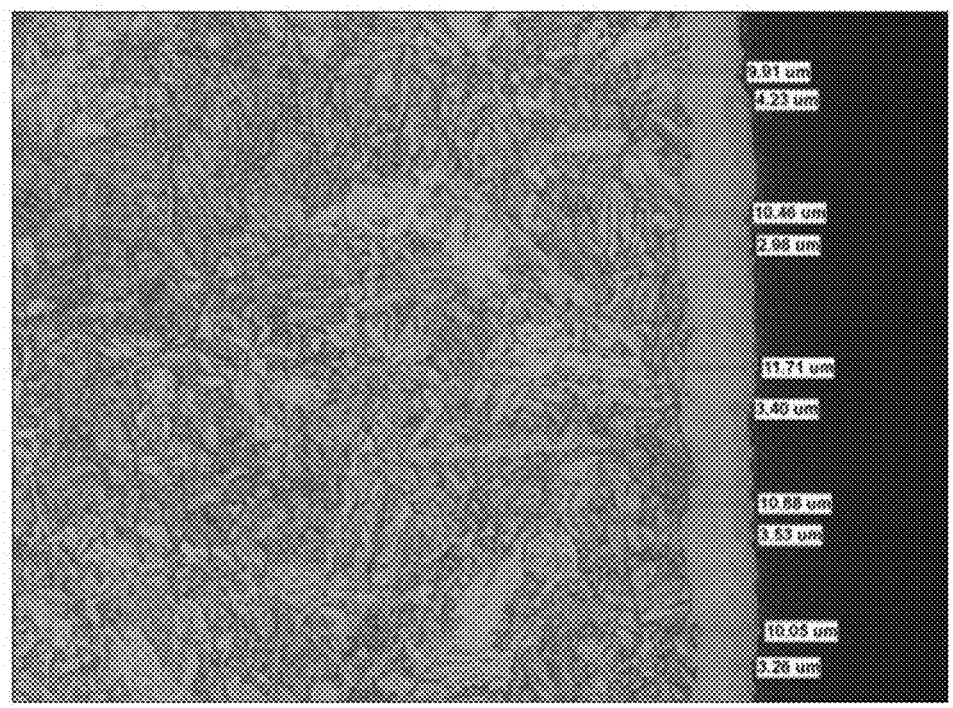
FIG. 5 is a diagram illustrating a microstructure by the heat treatment of Example 2 of the present disclosure.

On the other hand, FIG. 5 illustrates the microstructure of Example 2 of the condition of 540° C., 0.5 atmospheric pressure, and 10 hours, and illustrates that the thickness is 11.6 μm, the thickness of the pore layer is 3.5 μm, the hardness is 691 Hv, and the γ' fraction rate is 75.9%. It may be seen that the compound is sufficient compared to Comparative Example 2 and is equal to that of Comparative Example 1.

Figure 6:
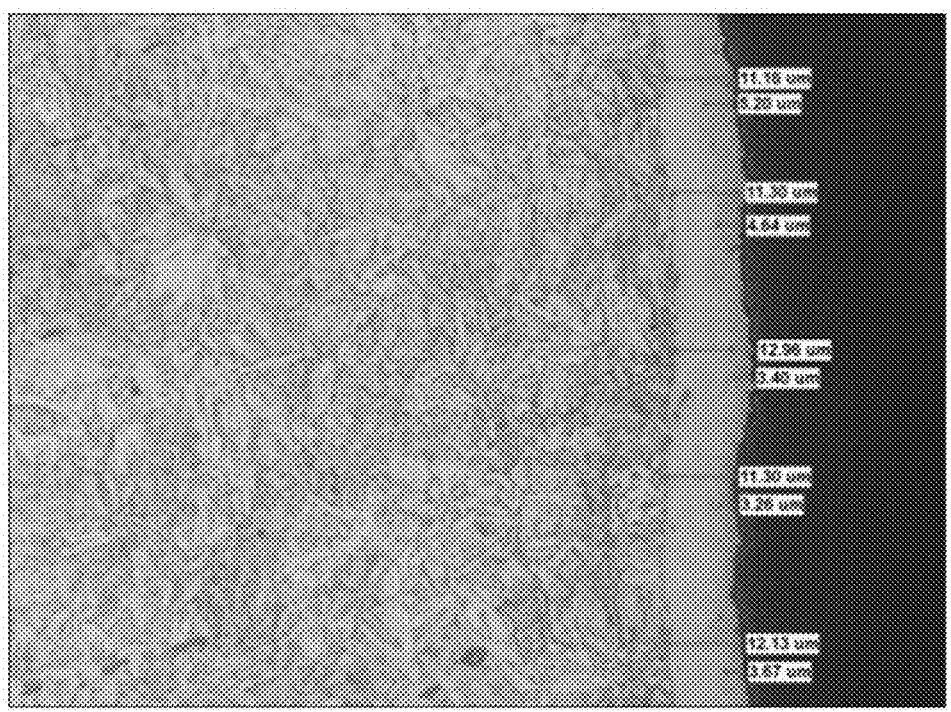
FIG. 6 is a diagram illustrating a microstructure by the heat treatment of Example 4 of the present disclosure.

Further, FIG. 6 illustrates the microstructure of Example 4 of the condition of 540° C., 0.3 atmospheric pressure, and 6 hours, and illustrates that the thickness is 12.1 μm, the thickness of the pore layer is 3.6 μm, the hardness is 670 Hv, and the γ' fraction rate is 72.8%.

As described above, while the present disclosure has been described with reference to the drawings, the present disclosure is not limited to the described embodiment. It should be apparent to those having ordinary skill in the art that the present disclosure may be variously modified and changed without departing from the spirit and scope of the present disclosure. Therefore, the modified examples or the changed examples should be included in the claims of the present disclosure, and the scope of the present disclosure should be interpreted based on the appended claims.

What is claimed is:

1. A heat treatment method of a component for a vehicle, the heat treatment method comprising:
    heating an inner space of a heat treatment furnace in which a component for a vehicle is disposed in the inner space;
    stabilizing hydrogen ($H_2$) by injecting the $H_2$ into the inner space; and
    performing the nitrification heat treatment for the component by injecting only ammonia ($NH_3$) into the inner space after the stabilizing,
    wherein the performing of the nitrification heat treatment injects the $NH_3$ at a speed of 0.5 to 6 $m^3$/h.

2. The heat treatment method of claim 1,
    wherein the performing of the nitrification heat treatment is performed by maintaining a pressure of the inner space at 230 to 400 torr.

3. The heat treatment method of claim 2,
    wherein the performing of the nitrification heat treatment is performed in a state where a temperature of the inner space is 400 to 600° C. by the heating.

4. The heat treatment method of claim 3,
    wherein the performing of the nitrification heat treatment is performed for 6 to 15 hours.

5. The heat treatment method of claim 2,
    wherein the stabilizing injects the $H_2$ at a speed of 0.5 to 15 $m^3$/h.

6. The heat treatment method of claim 5,
    wherein the stabilizing is performed by maintaining the pressure of the inner space at 230 to 400 torr.

7. The heat treatment method of claim 6,
    wherein the stabilizing is performed in a state where a temperature of the inner space is 400 to 600° C. by the heating.

8. The heat treatment method of claim 7,
    wherein the stabilizing is performed within 2 hours.

9. The heat treatment method of claim 1,
    wherein a thickness of a compound layer formed on a surface of the component subjected to the nitrification heat treatment is 8 to 20 μm.

10. The heat treatment method of claim 1,
    wherein a thickness of a pore layer formed on a surface of the component subjected to the nitrification heat treatment is 2 to 5 μm.

11. The heat treatment method of claim 1,
    wherein a surface hardness of the component subjected to the nitrification heat treatment is 620 to 710 Hv.

12. The heat treatment method of claim 1,
    wherein a depth of a diffusion layer of a surface of the component subjected to the nitrification heat treatment is 0.5 mm or less.

13. The heat treatment method of claim 1,
    wherein a gamma prime (γ') phase of a microstructure of a surface of the component subjected to the nitrification heat treatment is 50 to 90%.

14. A heat treatment method of a component for a vehicle, the heat treatment method comprising:
    heating an inner space of a heat treatment furnace in which a component for a vehicle is disposed in the inner space;
    stabilizing hydrogen ($H_2$) by injecting the $H_2$ into the inner space; and
    performing the nitrification heat treatment for the component by injecting only ammonia ($NH_3$) into the inner space after the stabilizing,
    wherein a thickness of a compound layer formed on a surface of the component subjected to the nitrification heat treatment is 8 to 20 μm.

15. A heat treatment method of a component for a vehicle, the heat treatment method comprising:
    heating an inner space of a heat treatment furnace in which a component for a vehicle is disposed in the inner space;
    stabilizing hydrogen ($H_2$) by injecting the $H_2$ into the inner space; and
    performing the nitrification heat treatment for the component by injecting only ammonia ($NH_3$) into the inner space after the stabilizing,
    wherein a thickness of a pore layer formed on a surface of the component subjected to the nitrification heat treatment is 2 to 5 μm.

* * * * *